(No Model.)
J. HEATH.
FILTERING DEVICE FOR FEED WATER PIPES.
No. 337,154. Patented Mar. 2, 1886.
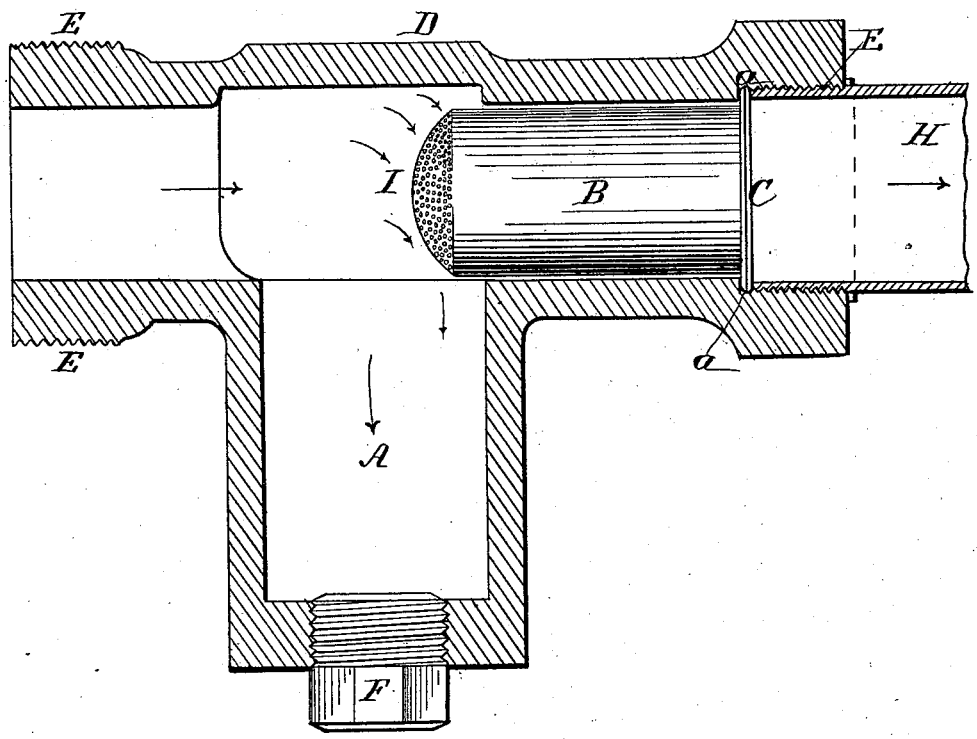
WITNESSES
R. E. Grant
Van Buren Hillyard
INVENTOR
John Heath
by Johnson & Johnson
Attorneys

UNITED STATES PATENT OFFICE.

JOHN HEATH, OF JANESVILLE, WISCONSIN.

FILTERING DEVICE FOR FEED-WATER PIPES.

SPECIFICATION forming part of Letters Patent No. 337,154, dated March 2, 1886.

Application filed September 30, 1885. Serial No. 178,616. (No model.)

*To all whom it may concern:*

Be it known that I, JOHN HEATH, a citizen of the United States, residing at Janesville, in the county of Rock and State of Wisconsin, have invented new and useful Improvements in Filtering Devices for Feed-Water Pipes, of which the following is a specification.

My improvement relates to strainers for feed-water pipes for supplying steam-boilers, to prevent dirt passing therein with the water.

I have shown in the drawing a pipe-section, D, provided with a screw, E, at each end for the attachment of the feed-water pipes. A drop-chamber, A, is formed in this section for the collection of sediment, and it has a screw-plug, F, in its lower part. The outlet end of the pipe-section is recessed to form an interior shoulder, $a$, and the screw at this end of the pipe-section is formed on its inner wall to receive the pipe H, leading to the boiler. I use a cylindrical strainer, B, seated in the pipe-section D, and held by a flange, C, upon the recess-shoulder $a$ by the abutting end of the feed-pipe E. The flanged end of the strainer is open, and its strainer end I extends over the chamber-plug, so that upon the removal of the latter and cutting off the supply from the boiler the flow from the supply-pipe will be directed downward through the opening in the bottom of the sediment-collecting chamber in a manner to thoroughly wash the projecting end of the strainer, and thus clean it and the sediment from the drop-chamber. The strainer end stands over the drop-chamber, so that the washing out flow will wash all around said end and over its perforations. The end of the strainer is preferably semi-cylindrical, and its overhanging relation to the drop-chamber allows the sediment and foreign substances to drop into the chamber, and the strainer will thereby be kept free from choking, and always permit a free flow to the feed-pipe, because the strainer overhangs and sheds the dirt constantly from its surface. Such arrangement of the strainer gives the advantage of permanently seating it, of keeping it free from clogging, and of washing off its perforated surface.

I claim—

The combination, with the pipe-section having the drop-chamber and the interior shoulder, $a$, of the cylindrical strainer having the seating-flange and its strainer end projecting into and overhanging the drop-chamber in line with the flow, whereby it will constantly shed the dirt and be washed in washing out the sediment-chamber.

In testimony whereof I have hereunto set my hand in the presence of two subscribing witnesses.

JOHN HEATH.

Witnesses:
M. M. PHELPS,
WM. SMITH.